US006928566B2

United States Patent
Nunomura

(10) Patent No.: US 6,928,566 B2
(45) Date of Patent: Aug. 9, 2005

(54) MULTIPROCESSOR SYSTEM CONTROLLING FREQUENCY OF CLOCK INPUT TO PROCESSOR ACCORDING TO RATIO OF PROCESSING TIMES OF PROCESSORS, AND METHOD THEREOF

(75) Inventor: Yasuhiro Nunomura, Hyogo (JP)

(73) Assignee: Renesas Technology Corp., Tokyo (JP)

( * ) Notice: Subject to any disclaimer, the term of this patent is extended or adjusted under 35 U.S.C. 154(b) by 696 days.

(21) Appl. No.: 09/928,358

(22) Filed: Aug. 14, 2001

(65) Prior Publication Data

US 2002/0095610 A1 Jul. 18, 2002

(30) Foreign Application Priority Data

Jan. 18, 2001 (JP) ........................................ 2001-009802

(51) Int. Cl.[7] .............................................. G06F 9/00
(52) U.S. Cl. ...................... 713/322; 713/320; 713/400; 713/600
(58) Field of Search ................................ 713/400–601, 713/321–324

(56) References Cited

U.S. PATENT DOCUMENTS

| | | | |
|---|---|---|---|
| 5,774,704 A | * | 6/1998 | Williams ..................... 713/501 |
| 6,026,231 A | * | 2/2000 | Tymchenko ................. 713/501 |
| 6,141,762 A | * | 10/2000 | Nicol et al. .................. 713/300 |
| 6,298,448 B1 | * | 10/2001 | Shaffer et al. .............. 713/322 |
| 6,715,089 B2 | * | 3/2004 | Zdravkovic ................. 713/322 |

FOREIGN PATENT DOCUMENTS

| | | | |
|---|---|---|---|
| JP | 5-28116 | 2/1993 | |
| JP | 8-6681 | 1/1996 | |
| JP | 08-190535 A | * 7/1996 | ........... G06F/15/16 |

OTHER PUBLICATIONS

Machine translation of JP 05–028116.*
Machine translation of JP 08–190535.*
"Computer Architecture: Design and Performance", B. Wilkinson, Apr. 30, 1994, p. 210.
"Real-Time Task Scheduling for a Variable Voltage Processor", T. Okuma et al., The Journal of The Institute of Electronics, Information and Communication Engineers, C vol. J83–C No. 6, Jun. 2000, pp. 454–462.

* cited by examiner

*Primary Examiner*—Fritz M. Fleming
(74) *Attorney, Agent, or Firm*—McDermott Will & Emery LLP

(57) ABSTRACT

The first processor controls the clock frequency control unit according to a ratio between an estimate of the processing time of the first program and an estimate of the processing time of the second program, to change the frequency of a clock being input into the first processor. In addition, the first processor controls the variable power source according to the frequency of the clock being input into the first processor, to change the power supply voltage being supplied to the first processor. Thus, the power consumption of the first processor can be reduced considerably.

18 Claims, 17 Drawing Sheets

FIG. 5

```
main_procedure()                                    /* MAIN PROCESSING UNIT OF FIRST PROGRAM */
{
  B_is_done=0;
  invokeB();                                        /* ACTIVATE SECOND PROGRAM. PROCESSING TIME ESTIMATE IS Tb */ set_clock_frequency(Ta/Tb);                       /* LOWER CLOCK FREQUENCY WITHIN LIMIT DETERMINED BY Ta/Tb */
  set_power(table);                                 /* LOWER VOLTAGE REFERRING TO TABLE */
  do_something();                                   /* PROCESSING TO BE DONE WITH FIRST PROGRAM. PROCESSING TIME ESTIMATE IS Ta */ while (B_is_done)                                 /* WAIT FOR COMPLETION OF SECOND PROGRAM */
    /* do nothing */;
} interrupt_from_B()                                  /* INTERRUPT HANDLING ROUTINE OF FIRST PROGRAM */
{
  restore_power();                                  /* RETURN VOLTAGE TO ORIGINAL STATE */
  restore_clock_frequency();                        /* RETURN CLOCK FREQUENCY TO ORIGINAL STATE */
  B_is_done=1;
}
```

FIG. 12

```
main_procedure()                     /* MAIN PROCESSING UNIT OF FIRST PROGRAM */
{
  B_is_done=0;
  invokeB();                         /* ACTIVATE SECOND PROGRAM */ if(wait_count>WAIT_LIMIT)          /* IF COMPLETION OF SECOND PROGRAM WAS WAITED IN PREVIOUS PROCESSING, */
    set_clock_faster();               /* LOWER CLOCK FREQUENCY BY ONE STAGE */
  else if(wait_count==0)             /* IF SECOND PROGRAM WAS COMPLETED EARLIER, */
    set_clock_slower();               /* RAISE CLOCK FREQUENCY BY ONE STAGE */
  else                               /* IF FIRST AND SECOND PROGRAMS WERE COMPLETED APPROXIMATE AT THE SAME TIME, */
    /* do nothing */;                /* DO NOTHING AND KEEP CURRENT CLOCK FREQUENCY */
  wait_count=0;

do_something();                    /* PROCESSING TO BE DONE IN FIRST PROGRAM */ while (B_is_done==0)               /* WAIT FOR COMPLETION OF SECOND PROGRAM */
    wait_count++;
} interrupt_from_B()                   /* INTERRUPT HANDLING ROUTINE OF FIRST PROGRAM */
{
  B_is_done=1;
}
```

FIG. 14

```
main_procedure()              /* MAIN PROCESSING UNIT OF FIRST PROGRAM */
{
B_is_done=0;
invokeB();                    /* ACTIVATE SECOND PROGRAM */

PREDICTED VALUE = OBTAIN PREDICTED VALUE FROM CURRENT STATE;
if (PREDICTED VALUE = "PREDICT THAT PROCESSING OF FIRST PROGRAM WILL BE COMPLETED FIRST")
    set_clock_faster();       /* LOWER CLOCK FREQUENCY BY ONE STAGE */
else (PREDICTED VALUE = "PREDICT THAT PROCESSING OF SECOND PROGRAM WILL BE COMPLETED FIRST")
    set_clock_slower();       /* RAISE CLOCK FREQUENCY BY ONE STAGE */
else /* PREDICT THAT FIRST AND SECOND PROGRAMS WILL BE COMPLETED APPROXIMATELY AT THE SAME TIME */
    /* do nothing */;         /* DO NOTHING AND KEEP CURRENT CLOCK FREQUENCY */
wait_count=0;

do_something();               /* PROCESSING TO BE DONE IN FIRST PROGRAM */ while (B_is_done==0)          /* WAIT FOR COMPLETION OF SECOND PROGRAM */
    wait_count++;
UPDATE STATE BY VALUE OF wait_count;
} interrupt_from_B()            /* INTERRUPT HANDLING ROUTINE OF FIRST PROGRAM */
{
B_is_done=1;
}
```

MULTIPROCESSOR SYSTEM CONTROLLING FREQUENCY OF CLOCK INPUT TO PROCESSOR ACCORDING TO RATIO OF PROCESSING TIMES OF PROCESSORS, AND METHOD THEREOF

BACKGROUND OF THE INVENTION

1. Field of the Invention

The present invention relates to a parallel processing technique to perform high-speed processing with a plurality of processors connected to each other, and more particularly, to a multiprocessor system allowing reduction of power consumption and a control method thereof.

2. Description of the Background Art

In recent years, there has been an increasing demand for improved processor performance in a variety of fields including multimedia processing and high-definition image processing. With the current LSI (large-scale integrated circuit) manufacturing techniques, however, there is a limit for speeding up of devices. Thus, parallel processing has attracted attention, and research and development of multiprocessor systems have vigorously been made.

Generally, when a plurality of processors are used for parallel processing to perform one processing, loads should be distributed to the processors as evenly as possible so as to obtain maximum performance of the entire system. In practical application designing, however, such uniform load distribution cannot necessarily be achieved when considering simplification of development, reduction of system cost and others. Thus, there often occurs a situation where one processor needs to wait for completion of processing of another processor.

There also exists a demand for reduced power consumption of a system for elongation of life of batteries mounted on portable equipment and for consideration for a recently advocated environmental issue. One way to reduce the power consumption of the system is to decrease a clock frequency for a part or a whole of the system according to an operating situation of the system.

FIG. 1 illustrates an example of such reduction of power consumption in a conventional multiprocessor system. This multiprocessor system includes a first processor 101, a second processor 102, a memory 103 storing a first program, a memory 104 storing a second program, and a clock supply control unit 105 controlling supply and stoppage of supply of a clock to first processor 101.

In the case where first processor 101 executes the first program stored in memory 103 and second processor 102 executes the second program stored in memory 104, assume that the processing time of first processor 101 is shorter than the processing time of second processor 102. In this case, these two processors are synchronized by causing first processor 101 to wait for the completion of the processing of second processor 102 at the end of the execution of the first program.

In such a system, if first processor 101 does not need to execute any processing until second processor 102 completes the processing, it would issue a control command to clock supply control unit 105 to force it to stop the clock supply to first processor 101 so as to reduce the power consumption of first processor 101.

In the multiprocessor system as described above, it may be possible to reduce the power consumption during the period from the time when first processor 101 completes its processing to the time when second processor 102 completes its processing, by stopping the clock supply to first processor 101. However, further reduction of power consumption cannot be expected.

SUMMARY OF THE INVENTION

An object of the present invention is to provide a multiprocessor system allowing considerable reduction of power consumption, and a control method thereof.

Another object of the present invention is to provide a multiprocessor system allowing efficient processing when reducing the power consumption, and a control method thereof.

According to an aspect of the present invention, the multiprocessor system having a plurality of processors synchronized after performance of parallel processing includes: a first processor; a second processor different from the first processor; and a clock frequency control unit that controls a frequency of a clock to be input to the first processor according to a ratio between a processing time of the first processor and a processing time of the second processor.

The clock frequency control unit controls the frequency of the clock being input into the first processor according to the ratio between the processing times of the first and second processors. Accordingly, the frequency of the clock being input to the first processor is optimized, which enables reduction of the power consumption of the first processor.

According to another aspect of the present invention, the method of controlling a multiprocessor system having a plurality of processors synchronized after performance of parallel processing includes the step of calculating a ratio between a processing time of a first processor and a processing time of a second processor, and the step of controlling a frequency of a clock being input to the first processor according to the calculated ratio.

The frequency of the clock being input into the first processor is controlled according to the ratio between the processing times of the first and second processors. Accordingly, the frequency of the clock being input to the first processor is optimized, and therefore, the power consumption of the first processor can be reduced.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 5 shows the processing procedure of the first processor 11 in FIG. 4 expressed by a C language-type pseudo program.

FIG. 12 shows the processing procedure of the first processor 11 in FIG. 11 expressed by a C language-type pseudo program.

FIG. 14 shows the processing procedure of the first processor 11 in FIG. 13 expressed by a C language-type pseudo program.

DESCRIPTION OF THE PREFERRED EMBODIMENTS

First Embodiment

Figure 1:
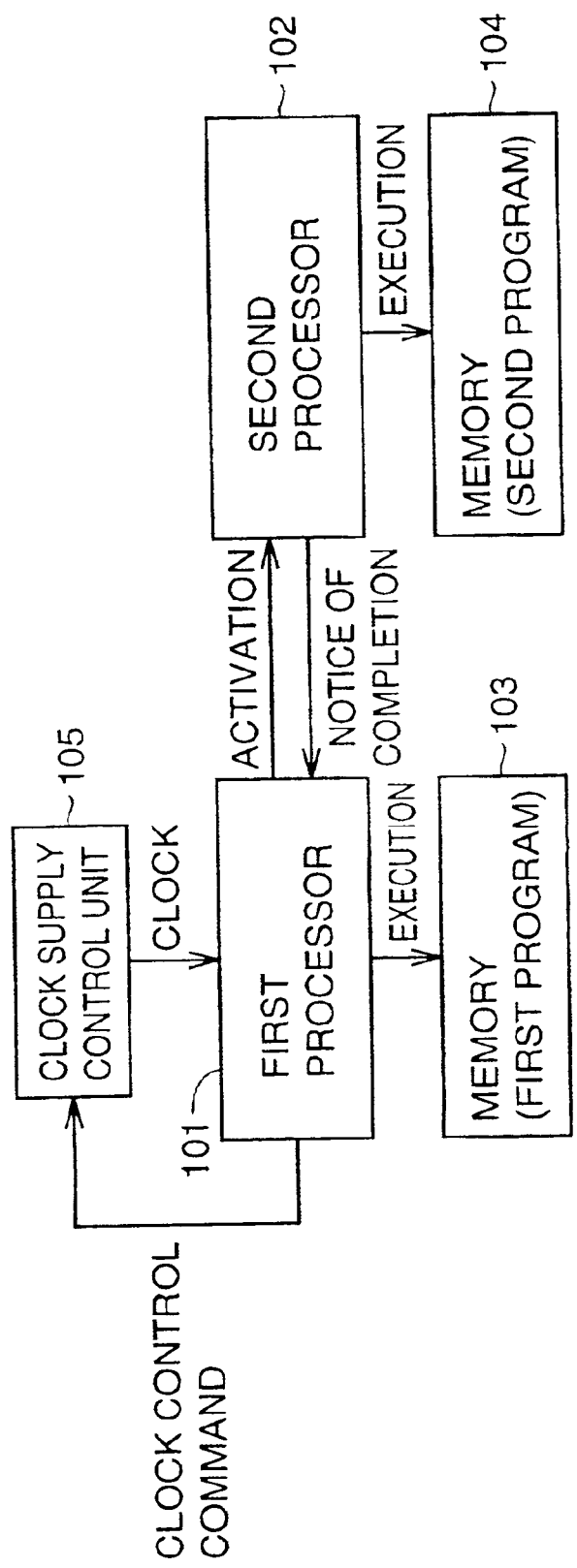
FIG. 1 is a block diagram showing a schematic configuration of a conventional multiprocessor system.
Figure 2:
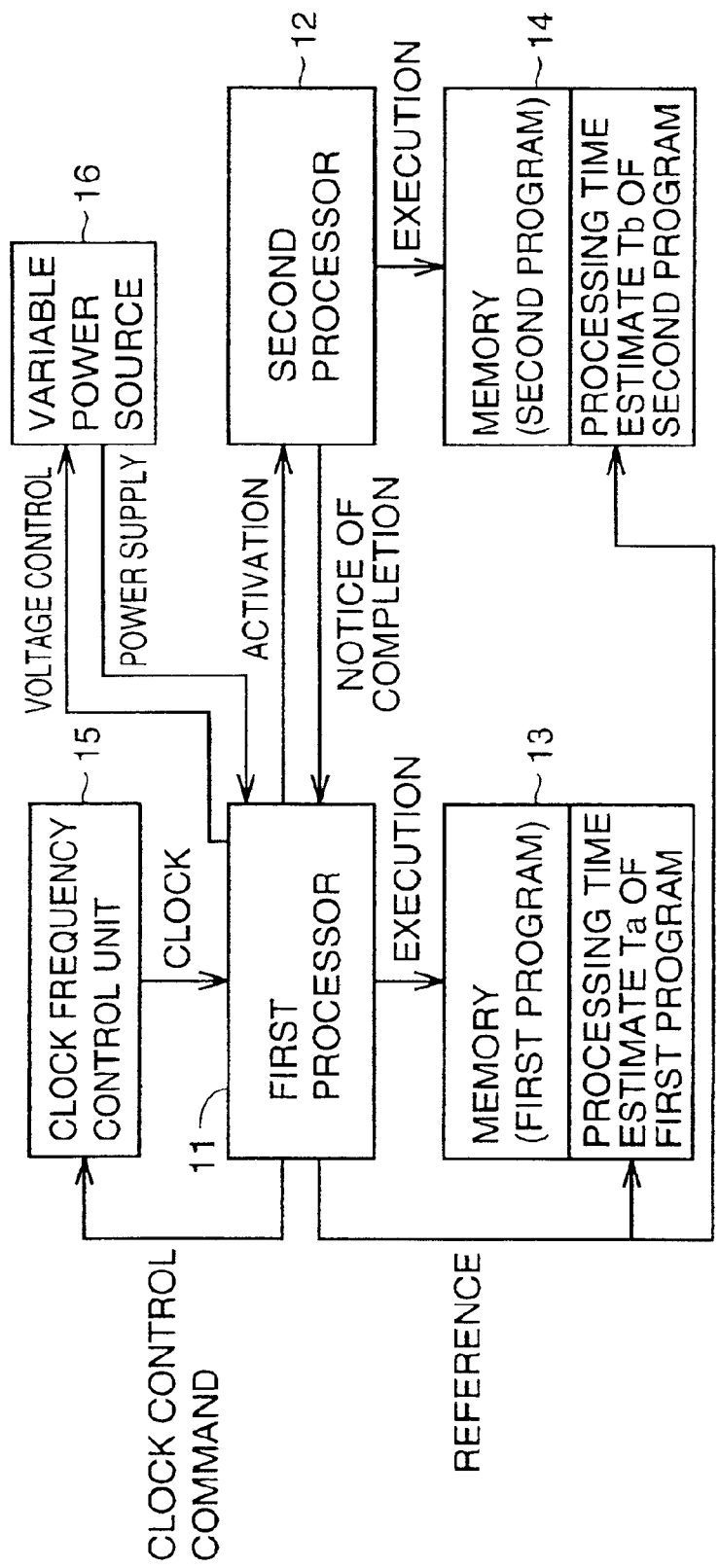
FIG. 2 is a block diagram showing a schematic configuration of a multiprocessor system according to a first embodiment of the present invention.

Referring to FIG. 2, the multiprocessor system according to the first embodiment of the present invention includes: a first processor 11; a second processor 12; a memory 13 having a first program and an estimate of a processing time (hereinafter, "processing time estimate") Ta of the first program stored therein; a memory 14 having a second program and a processing time estimate Tb of the second program stored therein; a clock frequency control unit 15 that controls a frequency of a clock being input into first processor 11; and a variable power source 16 that supplies a power supply voltage to first processor 11.

First processor 11 executes the first program stored in memory 13, and second processor 12 executes the second program stored in memory 14, so that parallel processing is performed. The system has a communication function implemented, e.g., by interruption, memory mapped input/output (I/O), shared memory, which allows communication of information between first processor 11 and second processor 12. This communication function is utilized both when first processor 11 activates execution of the second program of second processor 12 and when second processor 12 notifies first processor 11 of completion of the processing of the second program.

First processor 11 refers to processing time estimate Ta of the first program stored in memory 13 and processing time estimate Tb of the second program stored in memory 14 to determine the clock frequency being input into first processor 11, and issues a clock control command to clock frequency control unit 15. Processing time estimate Ta of the first program and processing time estimate Tb of the second program are estimated, for example, by programmers who have created the first and second programs, which are prestored in memories 13 and 14, respectively. How the clock frequency is determined will be described later in detail.

Figure 3:
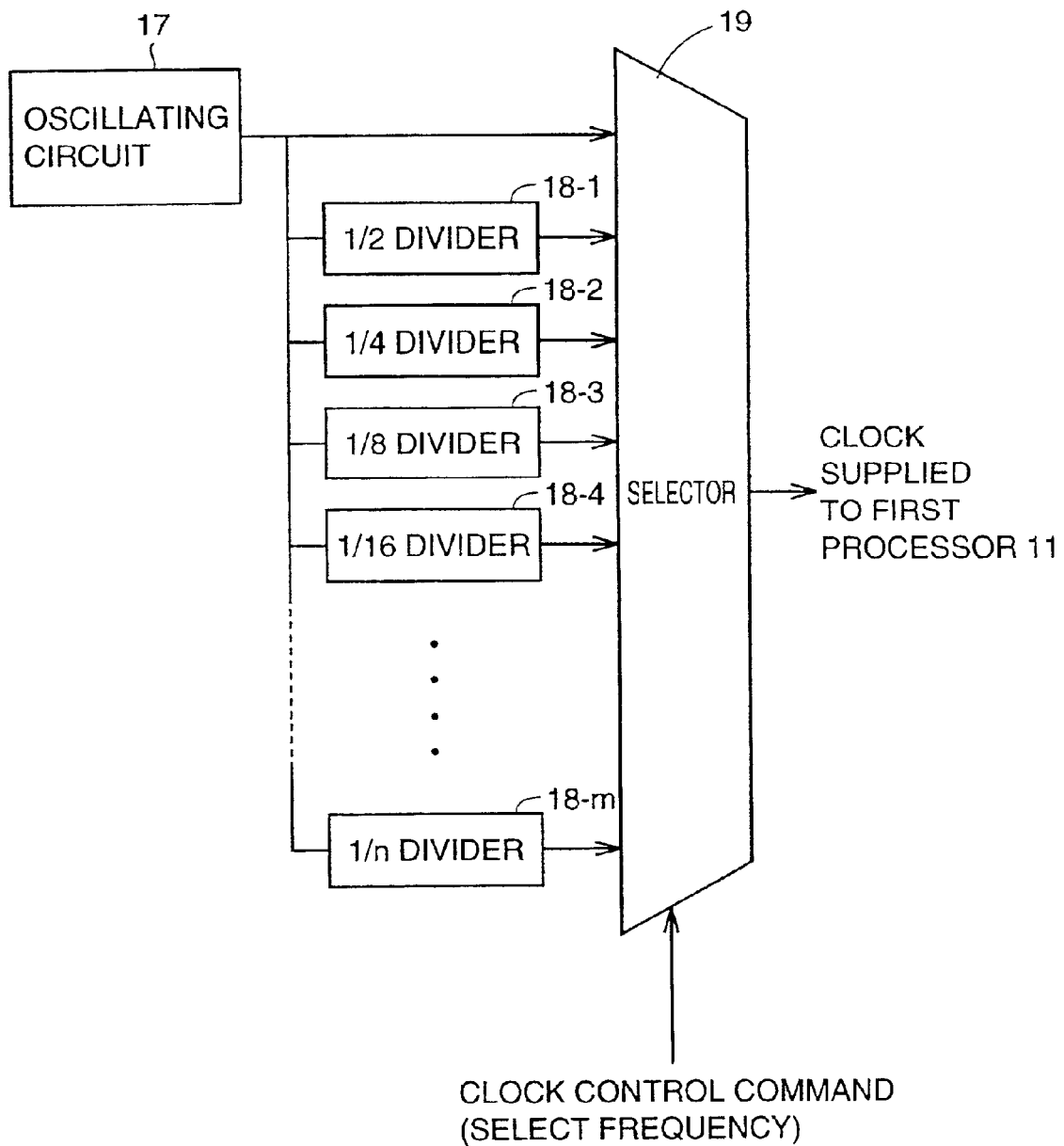
FIG. 3 illustrates the clock frequency control unit 15 in detail.

FIG. 3 shows details of clock frequency control unit 15. Clock frequency control unit 15 includes an oscillating circuit 17, a plurality of dividers 18-1 to 18-m that divides the clock output from oscillating circuit 17, and a selector 19 that selects one of the outputs of the plurality of dividers 18-1 to 18-m for output.

Oscillating circuit 17 outputs a clock having a frequency that is at least the maximum frequency of the clock being input to first processor 11. Dividers 18-1 to 18-m each divide the clock output from oscillating circuit 17 by $2^i$ (i=1, 2, ..., m). Selector 19 selects one of the outputs from oscillating circuit 17 and dividers 18-1 to 18-m, according to a clock control command (frequency select signal) received from first processor 11, and outputs the selected clock.

Figure 4:
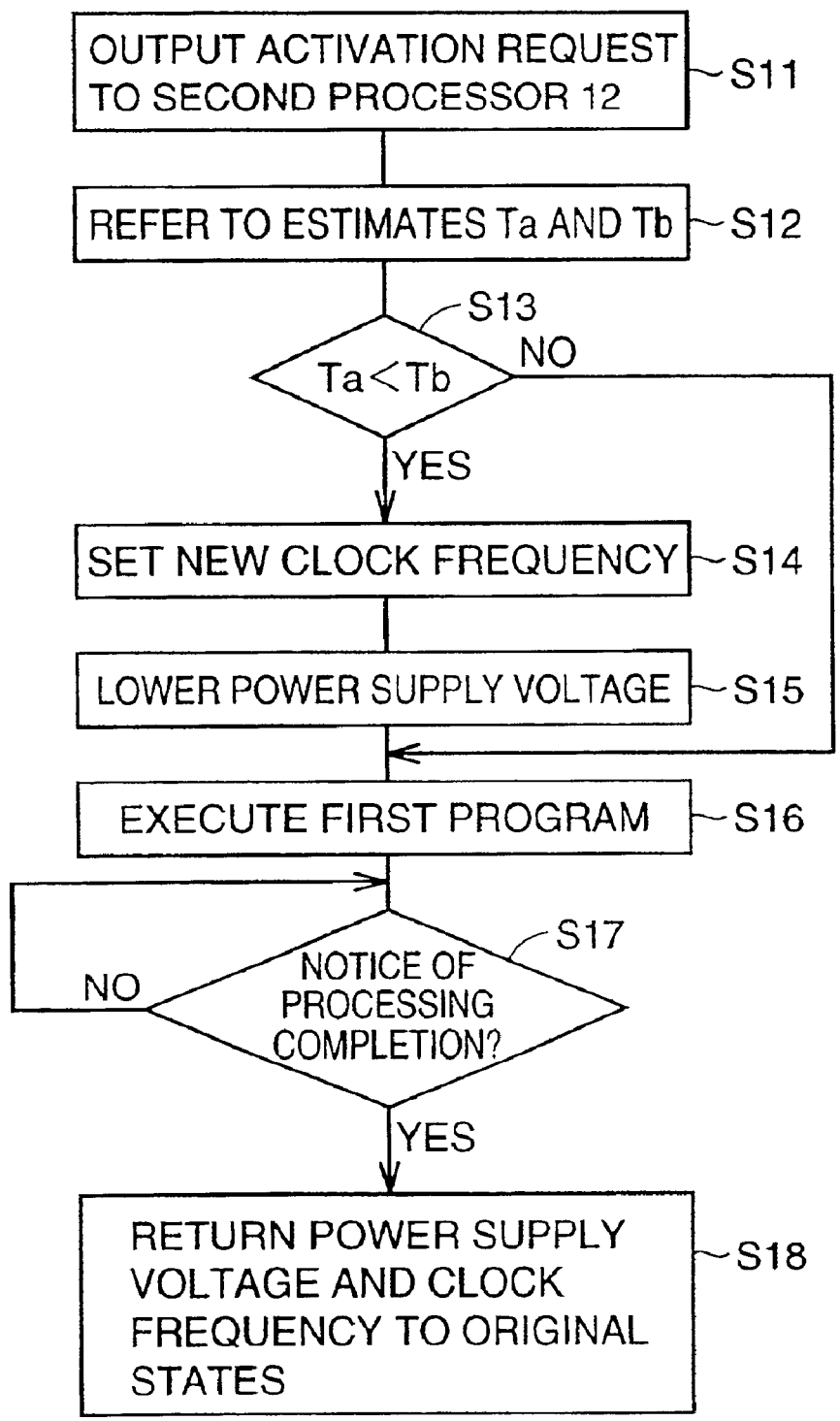
FIG. 4 is a flow chart illustrating a processing procedure of the first processor 11 of the first embodiment.

FIG. 4 illustrates the processing procedure of first processor 11 of the present embodiment. First processor 11 first outputs an activation request to second processor 12, requesting second processor 12 to execute the second program (S11). First processor 11 then refers to processing time estimate Ta of the first program stored in memory 13 and processing time estimate Tb of the second program stored in memory 14 (S12), to determine whether estimate Tb is greater than estimate Ta (S13). If estimate Tb is not greater than estimate Ta ("No" in S13), process goes to step S16, without altering the clock frequency of first processor 11.

If estimate Tb is greater than estimate Ta ("Yes" in S13), first processor 11 determines and sets, based on processing time estimates Ta and Tb, the clock frequency to be newly input to first processor 11 within the range indicated by the following expression:

$$f \times Ta/Tb \leq f' \leq f \qquad (1)$$

where "f" represents the original clock frequency, and "f'" represents the new clock frequency.

For example, if Tb/4<Ta≦Tb/2, first processor 11 outputs the clock control command to selector 19 such that the clock being output from the ½ divider 18-1 is selected. If Tb/8<Ta≦Tb/4, first processor 11 outputs the clock control command to selector 19 to force it to select the clock output from the ¼ divider 18-2.

Next, first processor 11 controls variable power source 16 to lower the power supply voltage being supplied to first processor 11 (S15), and starts execution of the first program (S16). Upon completion of the execution of the first program, first processor 11 uses the communication function described above to determine whether second processor 12 has notified of completion of the processing (S17). If not ("No" in S17), first processor 11 waits until the notice of processing completion arrives from second processor 12.

If second processor 12 has notified of the processing completion ("Yes" in S17), first processor 11 controls variable power source 16 to set the power supply voltage being supplied to first processor 11 back to the original level. First processor 11 also issues the clock control command to clock frequency control unit 15 to force it to set the clock frequency back to the original clock frequency (S18). Process is thus completed.

When the clock frequency is lowered, the power supply voltage can be decreased. This is because, with the lowered clock frequency, an increase of transition time (delay time) of each signal to some extent would not adversely affect the circuit operation. The relation between the clock frequency and an admissible voltage value can be predetermined through experimentation or others. The power supply voltage values are related with clock frequencies, which are prestored in a table form. First processor 11 performs the control of variable power source 16 as described above by referring to this table.

The C language-type pseudo program in FIG. 5 expresses the processing procedure of first processor 11 shown in FIG. 4. In this program, "B_is_done" indicates the state of execution of the second program by second processor 12. When it is "0", it means that the second program is being executed. "1" means that the execution of the second program is completed. The contents of processing in each step are not described here, since they are explained in detail in comment statements in FIG. 5.

In the program shown in FIG. 5, the notice of completion of the second program from second processor 12 is given by interruption. To employ the communication function other than the interruption, the memory mapped I/O or the shared memory as described above may be polled to obtain the notice of completion of the second program from second processor 12.

As described above, according to the multiprocessor system of the present embodiment, when first and second processors 11 and 12 perform parallel processing, first processor 11 is made to operate at a lower speed if first processor 11 is expected to complete the processing earlier than second processor 12. This allows reduction of power consumption of first processor 11, since the power consumption of a CMOS (complementary metal oxide semiconductor) logic circuit is in proportion to the clock frequency.

Further, by making first processor 11 operate at a low speed, the power supply voltage of first processor 11 can be reduced. This enables further reduction of power consumption of first processor 11, as the power consumption of the CMOS logic circuit varies directly with the square of the power supply voltage.

Second Embodiment

Figure 6:
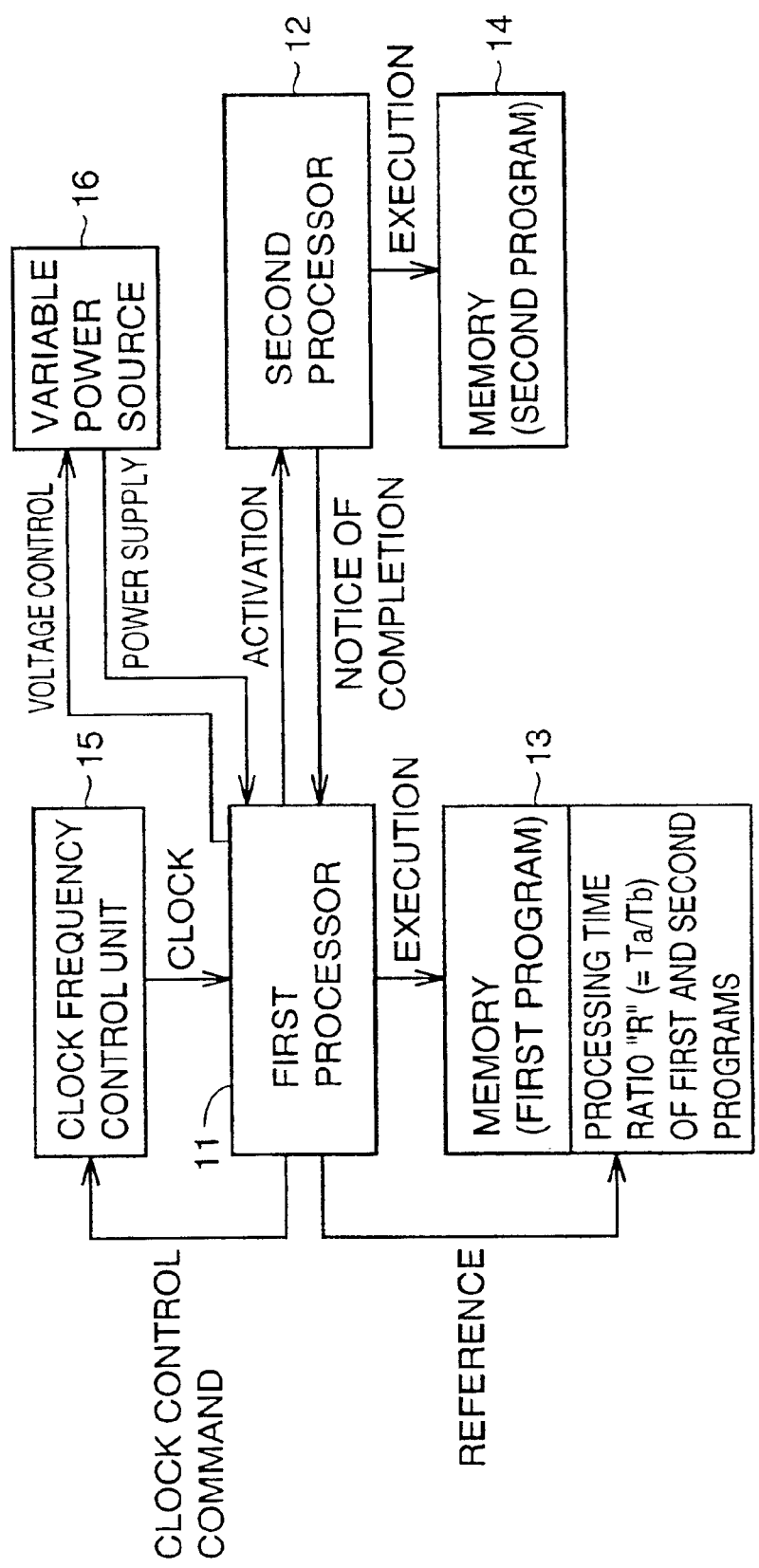
FIG. 6 is a block diagram showing a schematic configuration of a multiprocessor system according to a second embodiment of the present invention.

FIG. 6 is a block diagram schematically showing a configuration of a multiprocessor system according to the second embodiment. In the multiprocessor system of the first embodiment shown in FIG. 2, processing time estimates Ta and Tb of the first and second programs have been prestored in memories 13 and 14, respectively. In the second embodiment, instead thereof, a ratio R (=Ta/Tb) of the processing times of the first and second programs is prestored in memory 13. Otherwise, the system of the second embodiment is identical to that of the first embodiment, and therefore, detailed description of the common configurations and functions will not be repeated here. The processing time ratio R is estimated by, e.g., programmers who created the first and second programs, and prestored in memory 13.

Figure 7:
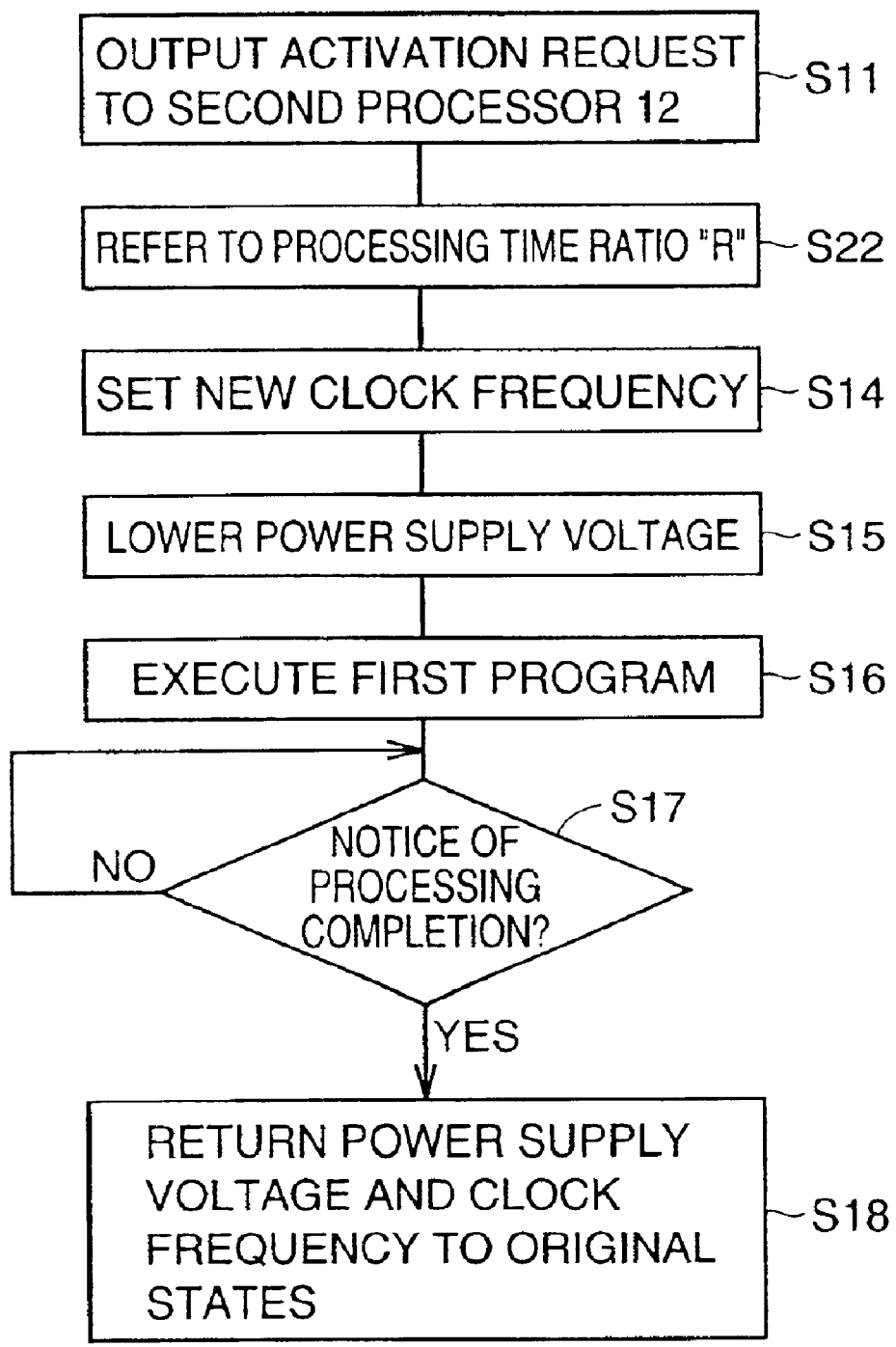
FIG. 7 is a flow chart illustrating a processing procedure of the first processor 11 according to the second embodiment.

FIG. 7 is a flow chart illustrating the processing procedure of first processor 11 of the present embodiment. It differs from the processing procedure of first processor 11 of the first embodiment, shown in FIG. 4, only in that steps S12 and S13 are replaced with step S22. Otherwise, they are identical to each other, so that detailed description of the common steps will not be repeated.

First processor 11 outputs an activation request to second processor 12 (S11), and refers to processing time ratio R of the first and second programs that is stored in memory 13 (S22). First processor 11 then determines and sets a clock frequency to be newly input to first processor 11 within a range indicated by the following expression (S14):

$$R \leq f'/f < 1 \qquad (2)$$

where "f" represents the original clock frequency, and "f'" represents the new clock frequency.

For example, if $\frac{1}{4} < R \leq \frac{1}{2}$, first processor 11 outputs a clock control command to selector 19 such that a clock output from the ½ divider 18-1 is selected. If $\frac{1}{8} < R \leq \frac{1}{4}$, first processor 11 outputs a clock control command to selector 19 such that it selects a clock output from the ¼ divider 18-2.

As described above, according to the multiprocessor system of the present embodiment, not only the benefits as in the first embodiment are enjoyed, but also the process for determining the new clock frequency is simplified, which reduces the process load of first processor 11. The multiprocessor system of the present embodiment is advantageous in the case where the first program is supposed to call a function realized by the second program, and it is programmed such that the first program is exclusively allowed to invoke the second program.

Third Embodiment

Figure 8:
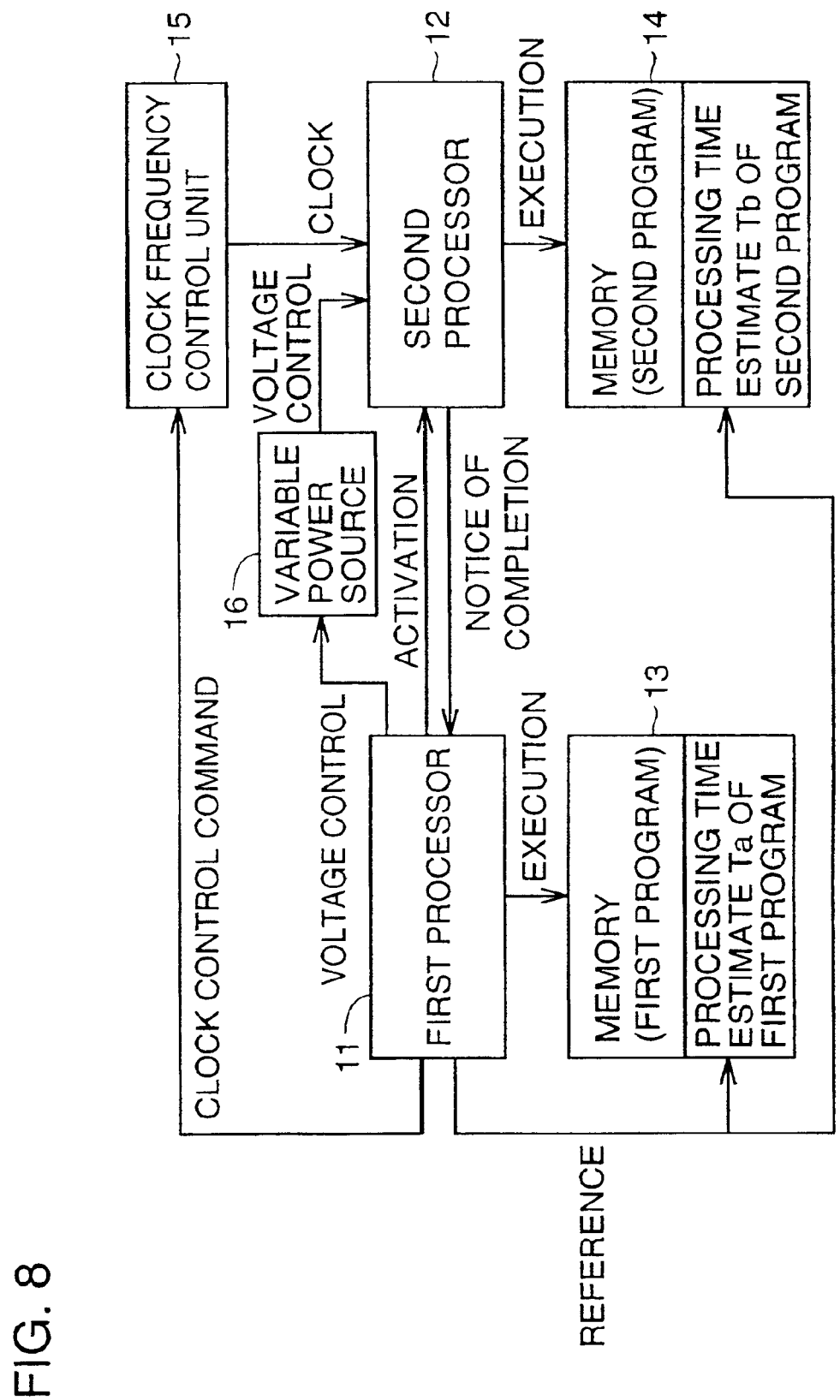
FIG. 8 is a block diagram showing a schematic configuration of a multiprocessor system according to a third embodiment of the present invention.

FIG. 8 is a block diagram showing a schematic configuration of a multiprocessor system of the third embodiment. The system of the present embodiment differs from the multiprocessor system of the first embodiment shown in FIG. 2 only in that the clock signal from clock frequency control unit 15 and the power supply voltage from variable power source 16 are supplied to second processor 12. Otherwise, the systems are identical to each other, and thus, detailed description of the common configurations and functions will not be repeated.

Figure 9:
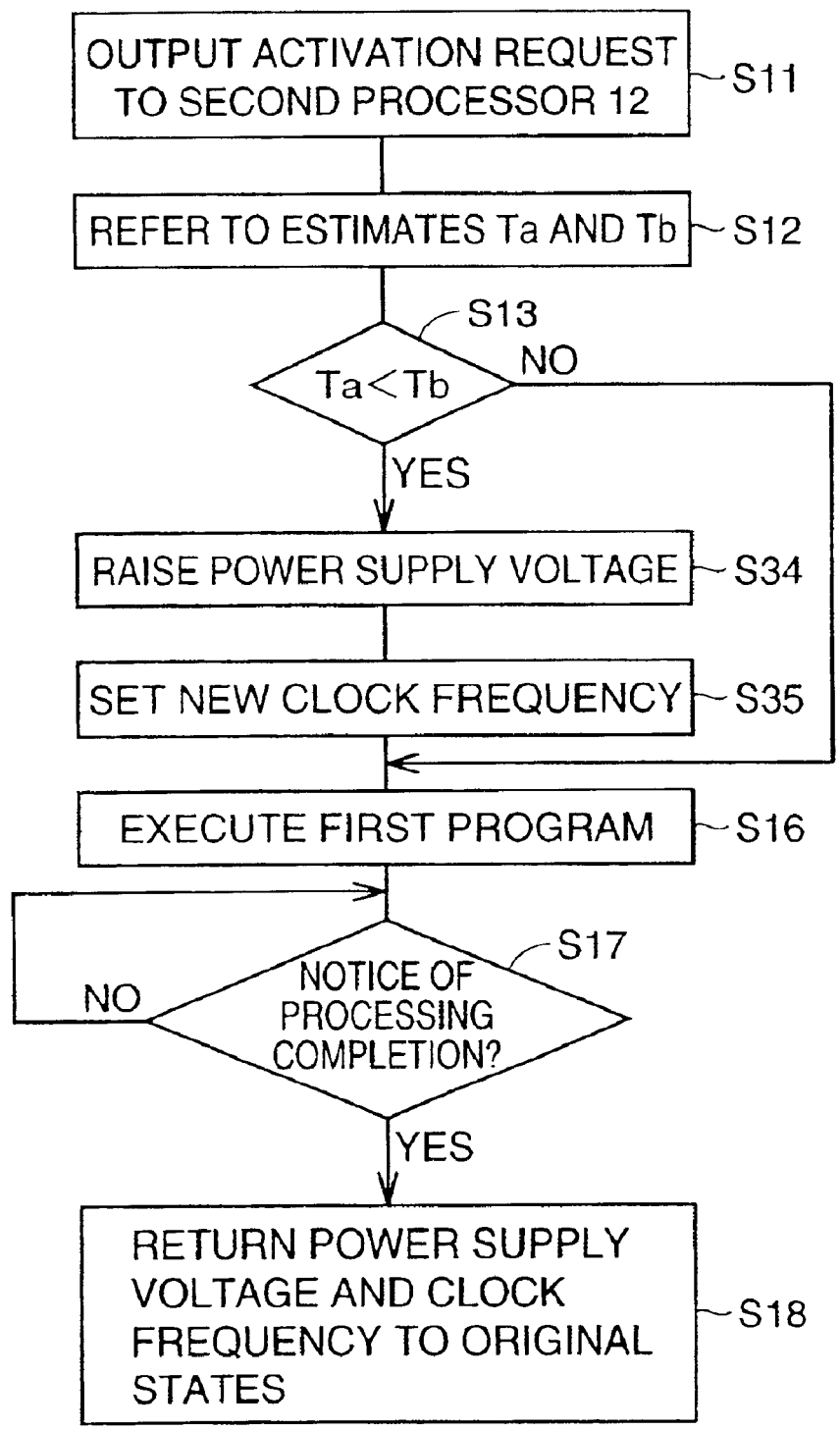
FIG. 9 is a flow chart illustrating a processing procedure of the first processor 11 according to the third embodiment.

FIG. 9 is a flow chart illustrating the processing procedure of first processor 11 of the present embodiment. It is identical to the processing procedure of first processor 11 of the first embodiment shown in FIG. 4, except that steps S14 and S15 are replaced with steps S34 and S35, and thus, detailed description of the common steps will not be repeated.

In step S13, if estimate Tb is greater than estimate Ta ("Yes" in S13), first processor 11 controls variable power source 16 to raise the power supply voltage being supplied to second processor 12 (S34).

Next, first processor 11 refers to processing time estimates Ta and Tb of the first and second programs, and determines and sets the clock frequency to be newly input into second processor 12 within a range defined by the following expression (S35):

$$f < f' \leq f \times Tb/Ta \qquad (3)$$

where "f" represents the original clock frequency, and "f'" represents the new clock frequency. Here, it is assumed that the original clock frequency "f" corresponds to the clock frequency in the case where the output from $\frac{1}{16}$ divider 18-4 has been selected.

For example, if $2Ta \leq Tb < 4Ta$, first processor 11 outputs a clock control command to selector 19 to force it to select the clock (two fold of the original clock frequency "f") output from ⅛ divider 18-3. If $4Ta \leq Tb < 8Ta$, first processor 11 outputs a clock control command to selector 19 such that the clock (four fold of the original clock frequency "f") output from ¼ divider 18-2 is selected. Steps S16 and afterwards are then performed.

As described above, according to the microprocessor system of the present embodiment, when first and second processors 11 and 12 perform parallel processing, second processor 12 is made to operate at a high speed only when first processor 11 is expected to finish the processing earlier than second processor 12. Accordingly, the power consumption of second processor 12 in a normal operating state (not performing the high-speed operation) can be reduced, since the power consumption of the CMOS logic circuit is proportional to the clock frequency.

Further, by making second processor 12 operate at a low speed in the normal operating state, the power supply voltage of second processor 12 can be lowered. This allows further reduction of the power consumption of second processor 12 in the normal state, as the power consumption of the CMOS logic circuit is proportional to the square of the power supply voltage. The configuration of the present embodiment is advantageous in the case where the entire multiprocessor system is preset to operate at a low speed and a processor therein is occasionally made to operate at a higher speed during the processing where necessary.

Fourth Embodiment

In the multiprocessor systems of the first through third embodiments, programmers have predetermined processing time estimates Ta and Tb of the first and second programs, and the clock frequency and the power supply voltage have been altered according to the estimates to reduce power consumption. However, the multiprocessor systems as in the first through third embodiments cannot be established if the processing times of the first and second programs vary each time of execution.

The multiprocessor system of the fourth embodiment is configured, when the first and second programs are repeatedly executed in parallel by first and second processors 11 and 12, to alter the clock frequency according to whether first processor 11 waited for the notice of processing completion of the second program from second processor 12 in the previous processing.

Figure 10:
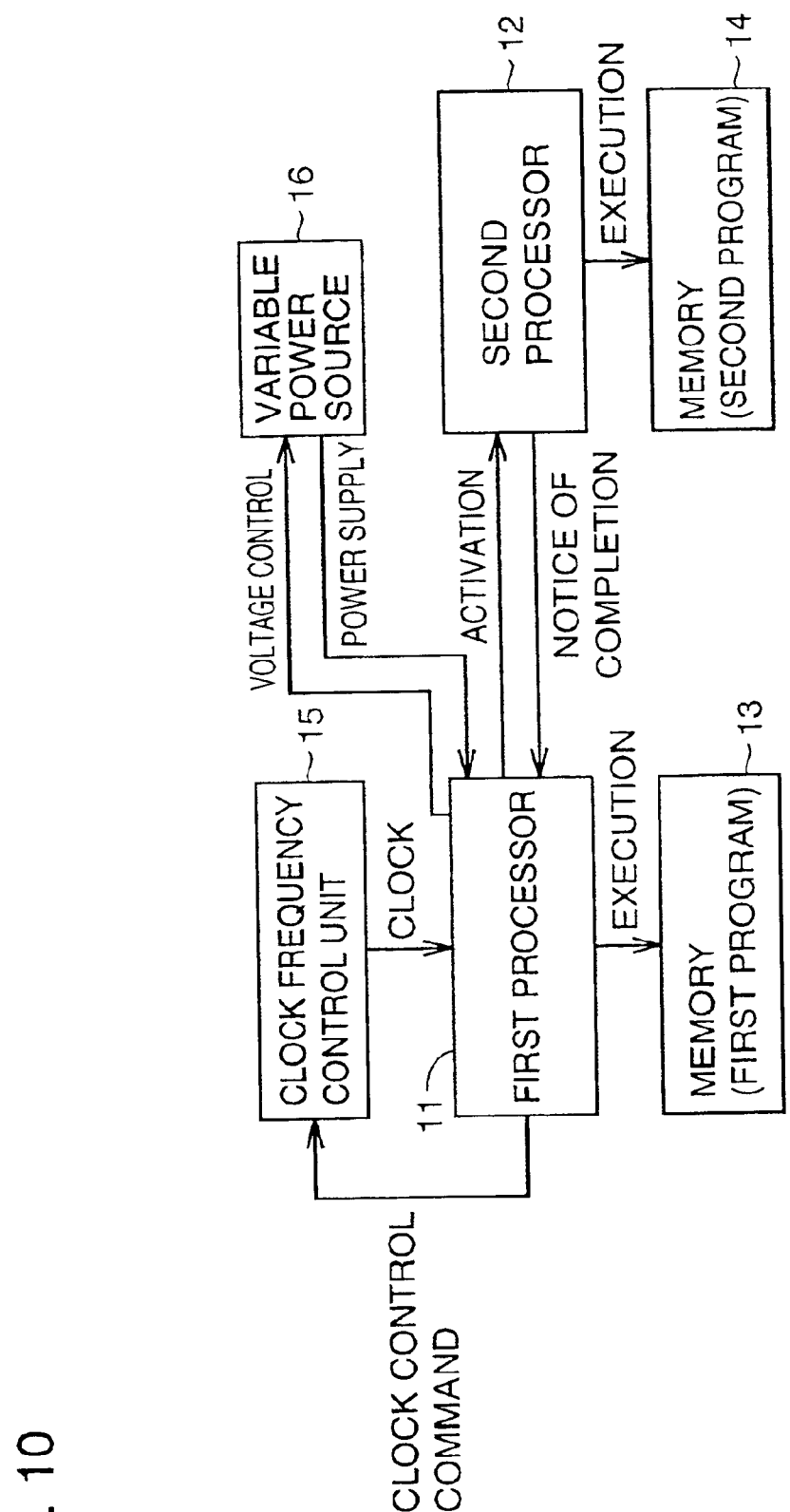
FIG. 10 is a block diagram showing a schematic configuration of a multiprocessor system according to a fourth embodiment of the present invention.

FIG. 10 is a block diagram showing a schematic configuration of the multiprocessor system according to the fourth embodiment. It differs from the multiprocessor system of the first embodiment shown in FIG. 2 in that processing time estimates Ta and Tb of the first and second programs are not stored in memories 13 and 14. Otherwise, the systems are identical to each other, and therefore, detailed description of the common configurations and functions will not be repeated. It should be noted, however, while the clock control unit 15 of the first embodiment shown in FIG. 3 outputs a clock divided by $2^i$ by switching the clocks output from oscillating circuit 17 and the plurality of dividers 18-1 to 18-m, the clock control unit of the present embodiment is able to switch the clocks in smaller steps or stages.

Figure 11:
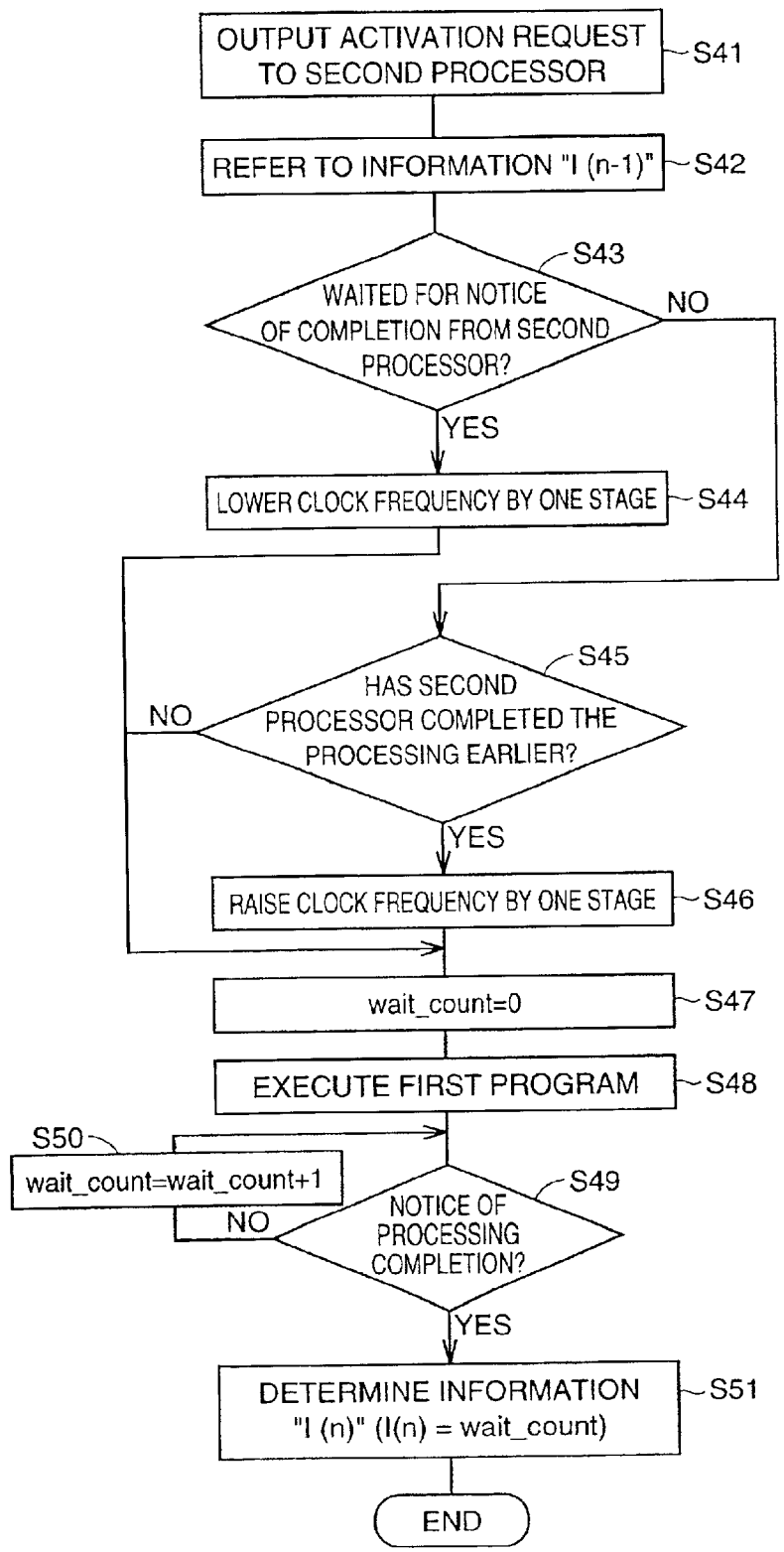
FIG. 11 is a flow chart illustrating a processing procedure of the first processor 11 according to the fourth embodiment.

FIG. 11 is a flow chart illustrating the processing procedure of first processor 11 of the fourth embodiment. First processor 11 first outputs an activation request for second processor 12 to request second processor 12 to execute the second program (S41). It then refers to information I (n-1) corresponding to the previous processing (S42), and compares the information I (n-1) with a predetermined threshold value WAIT_LIMIT to determine whether it waited for the notice of completion from second processor 12 in its previous processing of the first program (S43).

If first processor 11 waited for the notice of completion from second processor 12, i.e., if information I (n-1) is greater than the threshold value WAIT_LIMIT ("Yes" in S43), first processor 11 controls clock frequency control unit 15 to lower the clock frequency by one stage (S44). If first processor 11 did not wait for the completion notice from second processor 12 in the previous processing, i.e., if information I (n-1) is not greater than the threshold value WAIT_LIMIT ("No" in S43), first processor 11 further determines whether second processor 12 had completed the processing before first processor 11 completed the processing of the first program (S45).

If second processor 12 had finished the processing before first processor 11 finished the processing of the first program, i.e., if information I (n-1) is equal to "0" ("Yes" in S45), first processor 11 controls clock control unit 15 to raise the clock frequency by one stage (S46). If second processor 12 had completed the processing approximately at the same time as the completion of processing of the first program by first processor 11, i.e., if information I (n-1) is not equal to "0" ("No" in S45), the clock frequency is not altered, and process goes to step S47.

Next, first processor 11 assigns "0" to a register wait_count placed within first processor 11 (S47) and starts execution of the first program (S48). When the execution of the first program is completed, first processor 11 uses the communication function described above to determine whether the notice of processing completion has arrived from second processor 12 (S49). If not ("No" in S49), first processor 11 increments the value of wait_count by 1 (S50), and returns to step S49. If the notice of processing completion has arrived from second processor 12 ("Yes" in S49), first processor 11 assigns the value of wait_count to information I (n) to determine information I(n) (S51), and ends the processing. Here, "n" indicates how many times first processor 11 has processed the first program. This value of information I (n) is to be referred to in the subsequent processing in step S42.

FIG. 12 shows the processing procedure of first processor 11 shown in FIG. 11 by a C language-type pseudo program. In this program, "B_is_done" represents the state of execution of the second program by second processor 12. "0" indicates that the second program is being executed, and "1" indicates that the execution of the second program is completed. The contents of the processing in each step are explained in detail by the comment statements, and thus, description thereof is not provided here.

As described above, according to the multiprocessor system of the present embodiment, when first and second processors 11 and 12 perform parallel processing, the clock frequency is optimized by switching the clock frequency of first processor 11 according to which processor, first processor 11 or second processor 12, finished the processing earlier than the other in the past. The power consumption of first processor 11 can thus be reduced, as the power consumed by the CMOS logic circuit is proportional to the clock frequency.

Further, if the power supply voltage of first processor 11 is controlled meticulously while switching the clock frequency of first processor 11 as in the first through third embodiments, the power consumption of first processor 11 can further be reduced, as the power consumed by the CMOS logic circuit is proportional to the square of the power supply voltage.

Fifth Embodiment

In the multiprocessor system of the fourth embodiment, the clock frequency has been altered depending on whether first processor 11 had waited for the notice of processing completion of the second program from second processor 12 in the preceding processing. The multiprocessor system of the fifth embodiment controls the clock by predicting which processor, first processor 11 or second processor 12, will complete the processing first, according to whether first processor 11 had waited for the notice of processing completion of the second program from second processor 12 during a plurality of times of processing in the past.

The schematic configuration of the multiprocessor system of the present embodiment is identical to that of the fourth embodiment shown in FIG. 10, and therefore, detailed description of the common configurations and functions will not be repeated.

Figure 13:
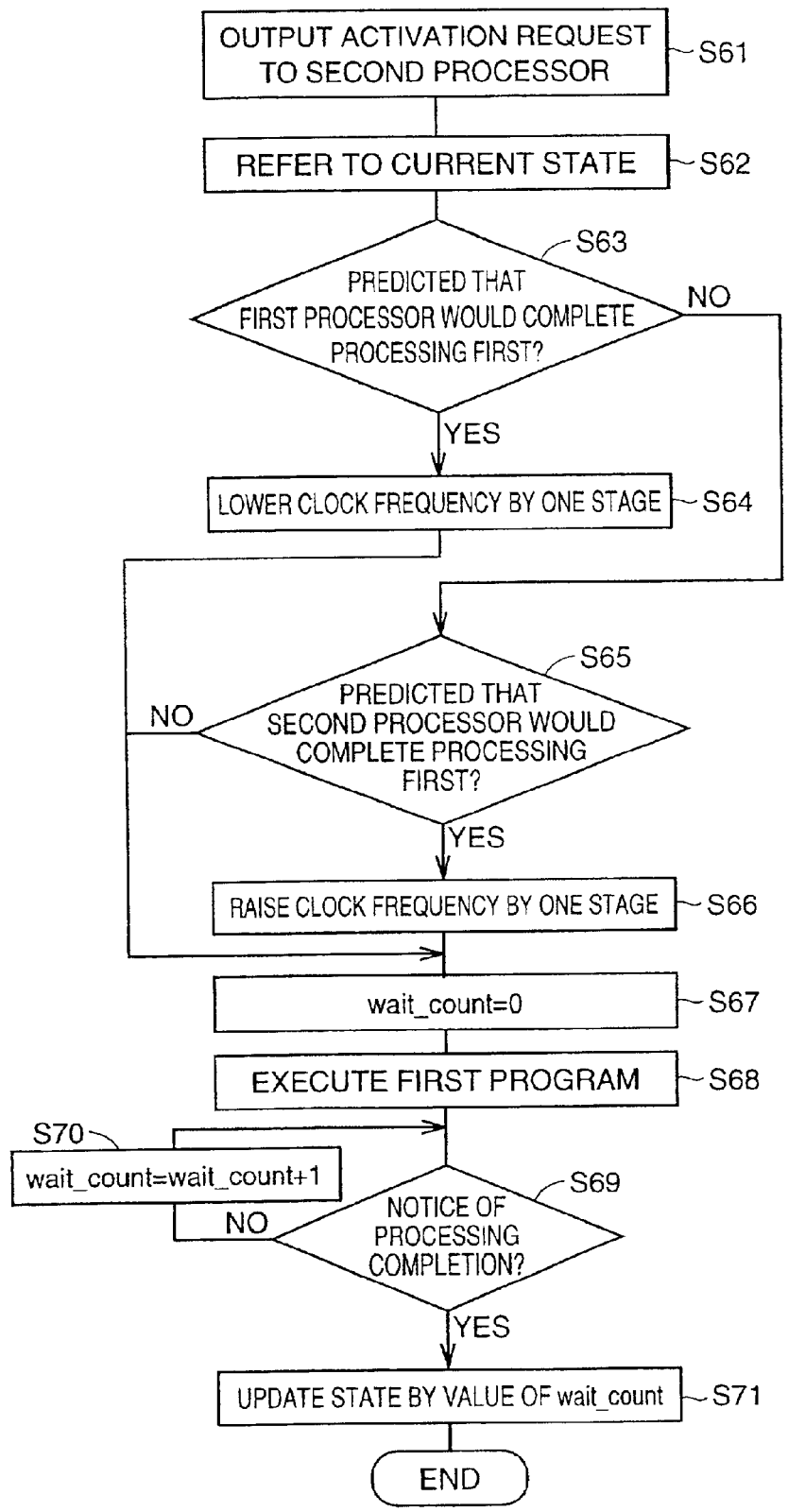
FIG. 13 is a flow chart illustrating a processing procedure of the first processor 11 according to a fifth embodiment.

FIG. 13 is a flow chart illustrating the processing procedure of first processor 11 of the present embodiment. First processor 11 first outputs an activation request to second processor 12, requesting second processor 12 to execute the second program (S61). First processor 11 then refers to the current state expressed by a value of a state register provided within first processor 11 (S62) to determine whether it has been predicted that first processor 11 (the first program) will complete processing earlier than second processor 12 (the second program) (S63). The state register is a register that retains a state number, as will be described later in conjunction with FIGS. 15 and 16. State transition is made by updating the value of this state register.

If it has been predicted that first processor 11 will finish the processing earlier than second processor 12 ("Yes" in S63), first processor 11 controls clock frequency control unit 15 to lower the clock frequency by one stage (S64). Otherwise ("No" in S63), first processor 11 further determines whether it has been predicted that second processor 12 will finish the processing earlier than first processor 11 (S65).

If it has been predicted that second processor 11 will finish the processing earlier than first processor 11 ("Yes" in S65), first processor 11 controls clock control unit 15 to raise the clock frequency by one stage (S66). Otherwise ("No" in S65), the clock frequency is not switched, and process goes to step S67.

Next, first processor 11 assigns "0" to the register wait_count provided within first processor 11 (S67), and starts execution of the first program (S68). When the execution of the first program is completed, first processor 11 determines whether second processor 12 has notified of completion of the processing, using the communication function described above (S69). If the notice of processing completion has not been received from second processor 12 ("No" in S69), first processor 11 increments the value of wait_count by 1 (S70), and returns to step S69. If the notice of processing completion is received from second processor 12 ("Yes" in S69), first processor 11 updates the state by the value of wait_count (S71), and terminates the processing. The state updating will be described later.

FIG. 14 shows the processing procedure of first processor 11 shown in FIG. 13 by a C language-type pseudo program. In the program, "B_is_done" indicates the state of execution of the second program by second processor 12, with "0" representing that the program is being executed and "1" representing that the program has been executed. The value of "wait_count" represents how long first processor 11 waited for the processing completion of second processor 12. The state transition as will be described later is determined by this value of "wait_count". The contents of processing in each step will not be described here, since they are explained in detail by the comment statements in FIG. 14.

Figure 15:
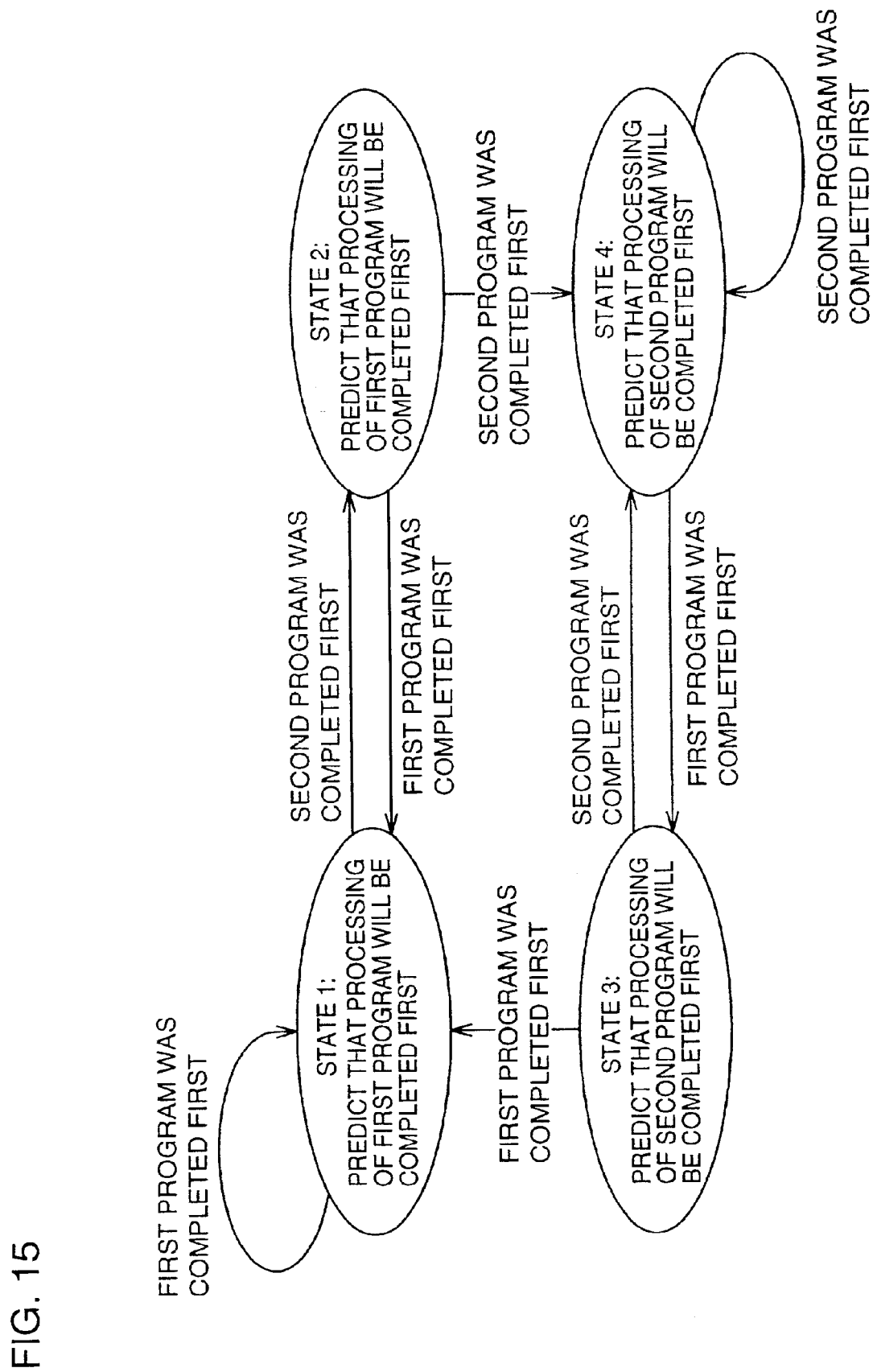
FIG. 15 shows an example of state transition diagram for use in predicting which of the first processor 11 and the second processor 12 will complete the processing earlier than the other.

FIG. 15 is a state transition diagram for use in predicting which processor, first processor 11 or second processor 12, will complete the processing earlier in the subsequent processing. Two operations "to obtain a predicted value from a current state" and "to update the state" primarily take a heuristic method. There are several possible ways for such a method, and FIG. 15 shows an example thereof. In FIG. 15, each ellipse represents a state, and each arrow represents state updating. The state transition diagram in FIG. 15 defines how state transitions are made depending on which processor, first processor 11 (first program) or second processor 12 (second program), completed the processing earlier than the other. Predicted values have been assigned to the respective states.

For example, when the current state is "state 1", the predicted value indicating "the prediction that the processing of the first program will be completed first" that is assigned to the relevant "state 1" is obtained by the operation "to take out the predicted value from the current state". When the current state is "state 1", if the processing of the second program was completed first, the state is updated from "state 1" to "state 2" by the operation "to update the state".

When step S71 in FIG. 13 is conducted in accordance with the state transition diagram of FIG. 15, a threshold value WAIT_LIMIT ($\geq 0$) is predetermined. When the value of wait_count exceeds the threshold value WAIT_LIMIT, it is determined that "the first program was completed first"; otherwise, it is determined that "the second program was completed first". The current value of the state register is then referred to, and the state is updated such that the state transition shown in FIG. 15 takes place.

Figure 16:
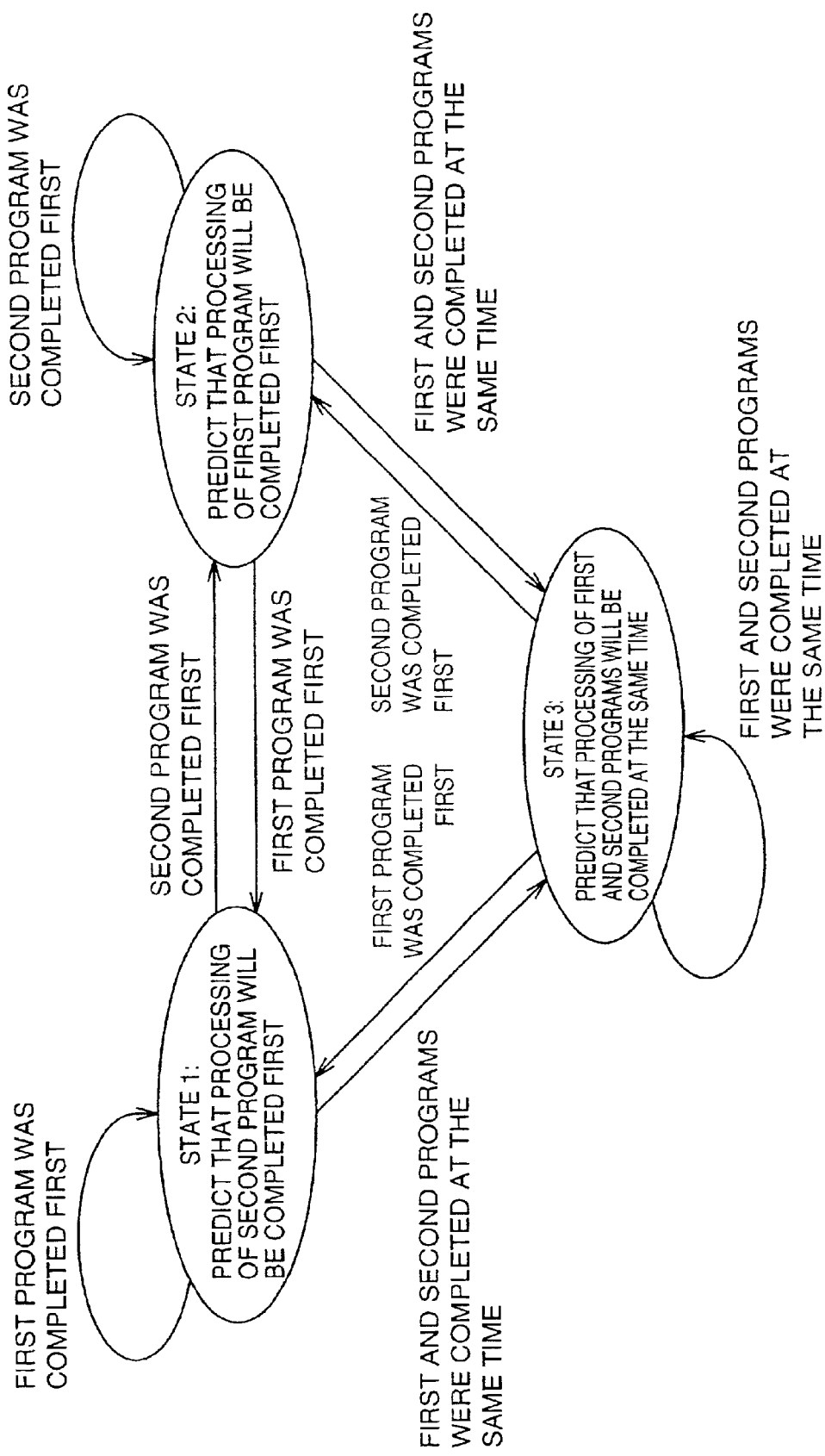
FIG. 16 shows another example of the state transition diagram for use in predicting which processor, 11 or 12, will complete the processing ahead of the other.

The state transition diagram of FIG. 15 implies a strategy that, "as the processing of the first program was completed earlier than that of the second program, the processing of the first program will again be completed first next time, even if the clock frequency is lowered." Another strategy conceivable is that, "as the processing of the first program was completed earlier than that of the second program, the clock frequency is lowered, so that next time the processing of the second program will be completed first." FIG. 16 shows a state transition diagram based on this strategy, which also takes into account the case where the processing times of the first and second programs become approximately equal to each other.

When step S71 in FIG. 13 is to be performed in accordance with the state transition diagram of FIG. 16, two threshold values WAIT_LIMIT 1 and WAIT_LIMIT 2 ($0 \leq$ WAIT_LIMIT 1<WAIT_LIMIT 2) are predetermined. If the value of wait_count exceeds the value of WAIT_LIMIT 2, it is determined that "the first program was completed first". If the value of wait_count exceeds the value of WAIT_LIMIT 1 but not greater than the value of WAIT_LIMIT 2, it is determined that "the first and the second programs were completed approximately at the same time". If the value of wait_count is not greater than the value of WAIT_LIMIT 1, it is determined that "the second program was completed first". According to the determined result, and referring to the current value of the state register, the state is updated such that the state transition shown in FIG. 16 takes place.

As described above, according to the multiprocessor system of the present embodiment, when first and second processors 11 and 12 perform parallel processing, the clock frequency is optimized by switching the clock frequency of first processor 11 according to the prediction as to which processor, first processor 11 or second processor 12, will complete the processing earlier than the other. This allows reduction of the power consumption of first processor 11, as the power consumption of the CMOS logic circuit is in proportion to the clock frequency.

Further, if the power supply voltage is controlled meticulously while switching the clock frequency of first processor 11 as in the multiprocessor systems of the first through third embodiments, the power consumption of first processor 11 may further be reduced, since the power consumption of the CMOS logic circuit is proportional to the square of the power supply voltage.

Sixth Embodiment

Figure 17:
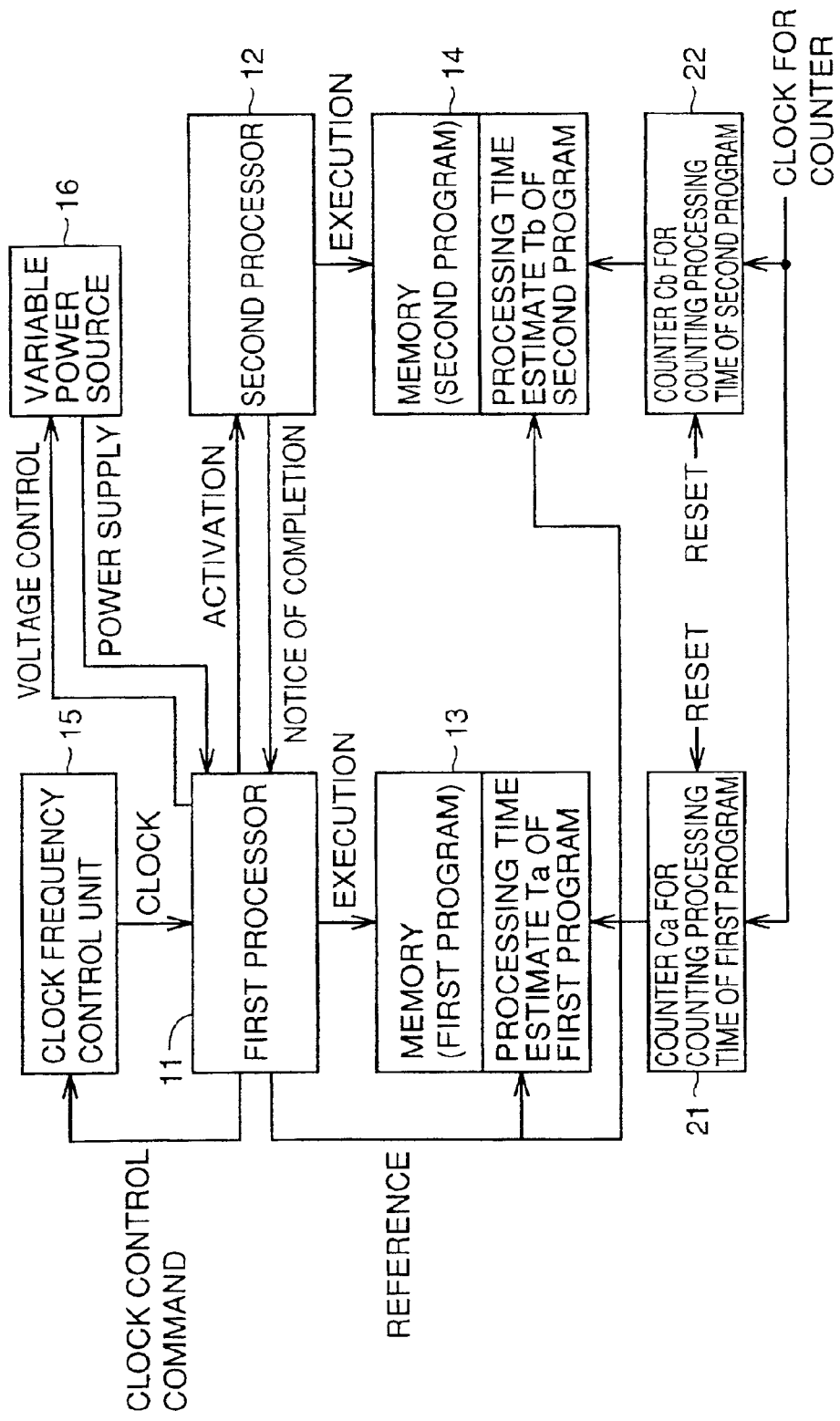
FIG. 17 is a block diagram showing a schematic configuration of a multiprocessor system according to a sixth embodiment of the present invention.

FIG. 17 is a block diagram showing a schematic configuration of a multiprocessor system according to the sixth embodiment. This system differs from the multiprocessor system of the first embodiment shown in FIG. 2 in that a counter 21 for counting the processing time of the first program by first processor 11 and a counter 22 for counting the processing time of the second program by second processor 12 are additionally provided. Otherwise, the systems are identical to each other, and therefore, detailed description of the common configurations and functions will not be repeated.

Counters 21 and 22 are incremented by counting a common clock (clock for counter). As such a clock for counter, a clock having a frequency smaller than that of the clock being supplied to first and second processors 11 and 12 is preferably employed for the purpose of reduction of the power consumption.

Counter 21 is reset at the time when first processor 11 starts execution of the first program, and incremented during the execution of the first program. When first processor 11 finished the execution of the first program, the counted value of counter 21 is transferred to memory 13 as processing time estimate Ta of the first program. Similarly, counter 22 is reset at the time when second processor 12 starts execution of the second program, and incremented during the execution of the second program. When second processor 12 finished the execution of the second program, the counted value of counter 22 is transferred to memory 14 as processing time estimate Tb of the second program.

Next time first processor 11 executes the first program, it will refer to the processing time estimate Ta of the first program stored in memory 13 and the processing time estimate Tb of the second program stored in memory 14 to determine the clock frequency to be input to first processor 11, and issue a clock control command to clock frequency control unit 15.

The processing procedure of the multiprocessor system of the present embodiment is identical to that of the multiprocessor system of the first embodiment shown in FIG. 4, and thus, detailed description thereof will not be repeated.

As described above, according to the multiprocessor system of the present embodiment, when first and second processors 11 and 12 perform parallel processing, first processor 11 is made to operate at a lower speed if first processor 11 is expected to complete the processing earlier than second processor 12 referring to the counted values of the processing times of the first and second programs in the previous processing. Thus, it becomes possible to reduce the power consumption of first processor 11, as the power consumed by the CMOS logic circuit is proportional to the clock frequency.

Further, by making first processor 11 operate at a low speed, the power supply voltage of first processor 11 is lowered. This allows further reduction of the power consumption of first processor 11, since the power consumption of the CMOS logic circuit is proportional to the square of the power supply voltage.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A multiprocessor system having a plurality of processors synchronized, comprising:
    a first processor for performing at least first predetermined processing;
    a second processor, different from said first processor, for performing at least second predetermined processing; and
    a clock frequency control unit for controlling a frequency of a clock being input to said first processor, according to a ratio between a processing time of said first processor necessary to complete said first predetermined processing and a processing time of said second processor necessary to complete said second predetermined processing.

2. The multiprocessor system according to claim 1, further comprising a voltage control unit for controlling a power supply voltage being supplied to said first processor, according to the frequency of the clock being input to said first processor.

3. The multiprocessor system according to claim 1, further comprising:
    a storage unit in which an estimate of the processing time of said first processor and an estimate of the processing time of said second processor are prestored; and
    a frequency changing unit for changing the frequency of the clock being input to said first processor by controlling said clock frequency control unit according to a ratio between the estimate of the processing time of said first processor and the estimate of the processing time of said second processor that are stored in said storage unit.

4. The multiprocessor system according to claim 1, further comprising:
    a storage unit in which a ratio between an estimate of the processing time of said first processor and an estimate of the processing time of said second processor is prestored; and
    a frequency changing unit for changing the frequency of the clock being input to said first processor by controlling said clock frequency control unit according to the ratio stored in said storage unit.

5. The multiprocessor system according to claim 1, further comprising a frequency determining unit that causes said clock frequency control unit to lower the frequency of the clock being input to said first processor when processing of said first processor was completed earlier than processing of said second processor in a previous time of processing, and that causes said clock frequency control unit to raise the frequency of the clock being input to said first processor when the processing of said second processor was completed earlier than the processing of said first processor in the previous time of processing.

6. The multiprocessor system according to claim 1, further comprising:
    a predicting unit for predicting which one of processing of said first processor and processing of said second processor will be completed earlier than the other; and
    a frequency changing unit for changing the frequency of the clock being input to said first processor by controlling said clock frequency control unit according to the predicted result by said predicting unit.

7. The multiprocessor system according to claim 1, further comprising:
- a predicting unit for predicting that said first processor will complete processing first when processing of said first processor was completed earlier than processing of said second processor in a previous time of processing, and predicting that said second processor will complete processing first when the processing of said second processor was completed earlier than the processing of said first processor in the previous time of processing; and
- a frequency changing unit for changing the frequency of the clock being input to said first processor by controlling said clock frequency control unit according to the predicted result by said predicting unit.

8. The multiprocessor system according to claim 1, further comprising:
- a predicting unit for predicting that said second processor will complete processing first when processing of said first processor was completed earlier than processing of said second processor in a previous time of processing, and predicting that said first processor will complete processing first when the processing of said second processor was completed earlier than the processing of said first processor in the previous time of processing; and
- a frequency changing unit for changing the frequency of the clock being input to said first processor by controlling said clock frequency control unit according to the predicted result by said predicting unit.

9. The multiprocessor system according to claim 1, further comprising:
- a first counting unit for counting the processing time of said first processor;
- a second counting unit for counting the processing time of said second processor; and
- a frequency changing unit for changing the frequency of the clock being input to said first processor by controlling said clock frequency control unit according to the counted result by said first counting unit and the counted result by said second counting unit.

10. A control method of a multiprocessor system having a plurality of synchronized processors, comprising the steps of:
- calculating a ratio between a processing time of a first processor necessary to complete first predetermined processing and a processing time of a second processor necessary to complete second predetermined processing; and
- controlling a frequency of a clock being input to said first processor according to said calculated ratio.

11. The control method of the multiprocessor system according to claim 10, further comprising the step of controlling a power supply voltage being supplied to said first processor according to the frequency of the clock being input to said first processor.

12. The control method of the multiprocessor system according to claim 10, wherein said step of controlling the frequency of the clock being input to said first processor includes the steps of
- calculating a ratio between a prestored estimate of the processing time of said first processor and a prestored estimate of the processing time of said second processor, and
- changing the frequency of the clock being input to said first processor according to the calculated ratio.

13. The control method of the multiprocessor system according to claim 10, wherein said step of controlling the frequency of the clock being input to said first processor includes the step of changing the frequency of the clock being input to said first processor according to a prestored ratio of an estimate of the processing time of said first processor and an estimate of the processing time of said second processor.

14. The control method of the multiprocessor system according to claim 10, wherein said step of controlling the frequency of the clock being input to said first processor includes the step of lowering the frequency of the clock being input to said first processor in the case where processing of said first processor was completed earlier than processing of said second processor in a previous time of processing, and raising the frequency of the clock being input to said first processor in the case where the processing of said second processor was completed earlier than the processing of said first processor in the previous time of processing.

15. The control method of the multiprocessor system according to claim 10, wherein said step of controlling the frequency of the clock being input to said first processor includes the steps of
- predicting which one of processing of said first processor and processing of said second processor will be completed earlier than the other, and
- changing the frequency of the clock being input to said first processor according to the predicted result.

16. The control method of the multiprocessor system according to claim 15, wherein said step of predicting which one of the processing of said first processor and the processing of said second processor will be completed earlier than the other includes the step of predicting that the processing of said first processor will be completed first in the case where processing of said first processor was completed earlier than processing of said second processor in a previous time of processing, and predicting that the processing of said second processor will be completed first in the case where the processing of said second processor was completed earlier than the processing of said first processor in the previous time of processing.

17. The control method of the multiprocessor system according to claim 15, wherein said step of predicting which one of the processing of said first processor and the processing of said second processor will be completed earlier than the other includes the step of predicting that the processing of said second processor will be completed first in the case where processing of said first processor was completed earlier than processing of said second processor in a previous time of processing, and predicting that the processing of said first processor will be completed first in the case where the processing of said second processor was completed earlier than the processing of said first processor in the previous time of processing.

18. The control method of the multiprocessor system according to claim 10, wherein said step of controlling the frequency of the clock being input to said first processor includes the steps of
- counting the processing time of said first processor,
- counting the processing time of said second processor, and
- changing the frequency of the clock being input to said first processor according to the counted processing time of said first processor and the counted processing time of said second processor.

* * * * *